R. T. MEYER.
SEPARATOR.
APPLICATION FILED OCT. 14, 1918.

1,402,783.

Patented Jan. 10, 1922.
2 SHEETS—SHEET 1.

INVENTOR
Robert T. Meyer,
BY
ATTORNEY.

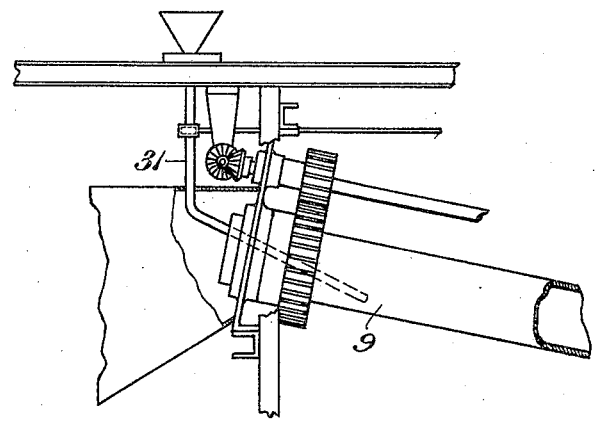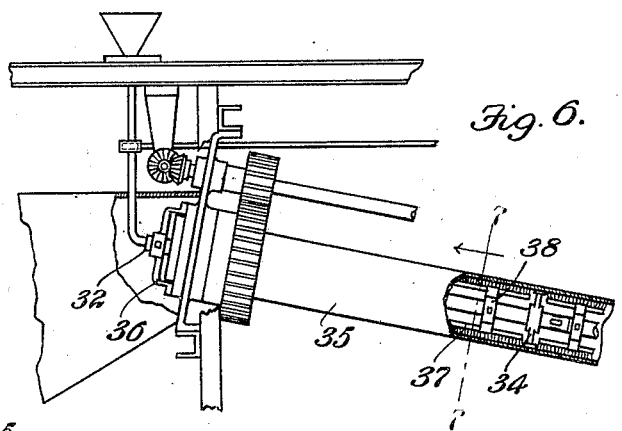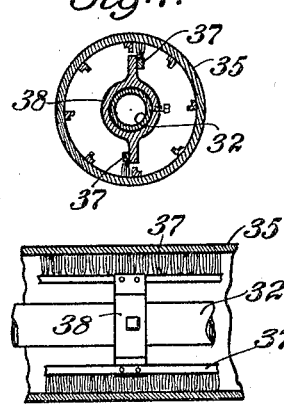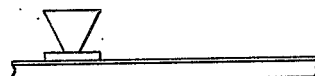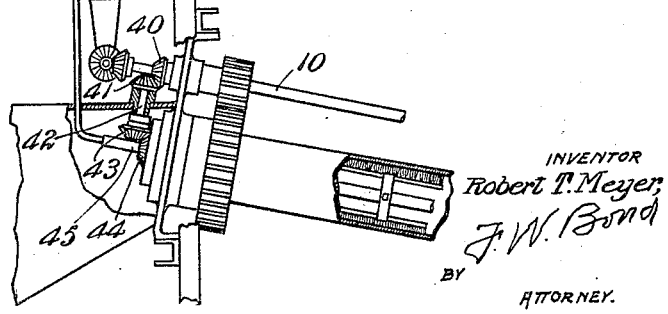

UNITED STATES PATENT OFFICE.

ROBERT T. MEYER, OF CANTON, OHIO.

SEPARATOR.

1,402,783.　　　Specification of Letters Patent.　　Patented Jan. 10, 1922.

Application filed October 14, 1918. Serial No. 257,931.

*To all whom it may concern:*

Be it known that I, ROBERT T. MEYER, a citizen of the United States, residing at Canton, in the county of Stark and State of Ohio, have invented a new and useful Separator, of which the following is a specification.

This invention relates to separators of the air suction type, the object being to construct a separator of this character with means for delivering the matter to be separated to a point within the separating cylinder where the maximum effect of the air current drawn through the particles to be separated can be secured.

Another object is to construct a separator of this class with means for keeping the matter to be separated in a thorough state of agitation until the separated particles have reached their respective discharge points.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings:

Fig. 5 is a fragmentary detail view showing another slight modification of feed pipe.

Fig. 6 is a fragmentary detail view showing a further modification employing a stationary tubular shaft with revolving brush thereon.

Fig. 7 is a cross sectional view on the line 7—7, Fig. 6.

Fig. 8 is a fragmentary longitudinal sectional view on an enlarged scale through the rotating cylinder shown in Fig. 6.

Fig. 9 is a further modified form showing means for independent rotation of the tubular shaft.

Similar numerals of reference indicate corresponding parts throughout the several figures of the drawings.

Figure 1:
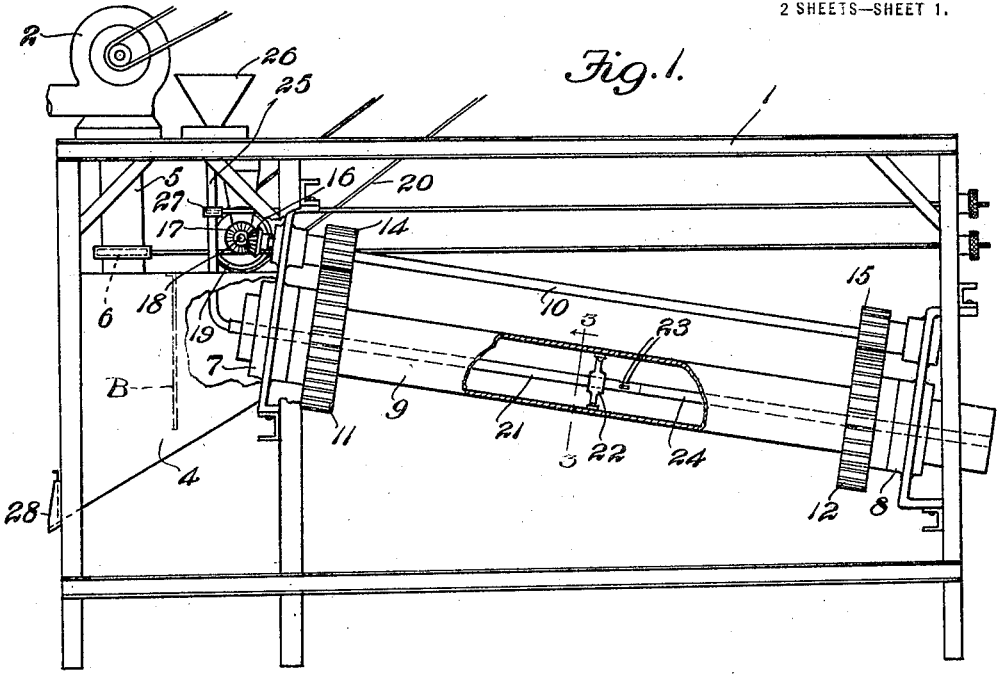
Figure 1 is a side elevation of my separator with a part of the framework and rotating cylinder broken away.
Figure 2:
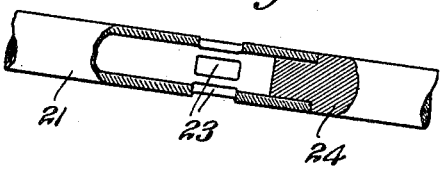
Fig. 2 is an enlarged detail sectional view of the tubular shaft.

The frame 1 of my separator is formed of channel bars or other suitable material and consists of substantially a rectangular framework with suitable cross braces and supports for carrying the separating mechanism. Mounted upon this frame is a suction fan 2, of ordinary construction, which is designed to create a suction within the air suction compartment 4 through the connecting tube 5, in which is located an air regulator valve 6. Secured to the frame 1 is a bearing 7 and a substantially similar bearing 8 in which bearings are revolubly mounted a cylinder 9 and drive shaft 10. Gears 11 and 12 carried by the cylinder 9 are arranged to mesh with smaller gears 14 and 15, respectively, which are carried by the shaft 10. A beveled pinion 16 secured to one extremity of the shaft 10 is arranged to mesh with a second beveled pinion 17 mounted upon a drive shaft 18. A pulley 19 mounted upon the shaft 18 is driven by a belt 20 leading to any well known source of power. The rotation of the shaft 18, will, through the meshing of the pinions 16 and 17 drive the shaft 10, which in turn through the meshing of the gears 11 and 14 and 12 and 15 rotate the cylinder 9.

Extending longitudinally and concentrically within the cylinder 9 is a hollow shaft 21 which is supported by brackets 22 secured within the cylinder. A series of apertures 23 are formed adjacent the lower extremity of the hollow shaft 21 and secured in the said lower extremity is a solid rod 24 which is mounted in bearings similar to the bearings 22. A feed pipe 25 extending downwardly from the hopper 26 enters the upper end of the tubular shaft 21. A regulator valve 27 is located within the feed pipe 25 and is designed to regulate the flow of material placed in the hopper 26 to the tubular shaft 21. A discharge door 28 is located in the lowermost portion of the chamber 4.

By the above described arrangement it will be seen that matter to be separated, such for instance as crushed metal ore, when placed in the hopper 26 will feed downwardly through the feed pipe 25 and into the tubular shaft 21. The rotation of the cylinder 9 will obviously rotate the tubular shaft 21 and thus feed the particles of ore or other matter downwardly through said tubular shaft and discharge it through the perforations 23. The suction caused by the fan 2 through the chamber 4 will be drawn through the lower end of the cylinder 9 thus as the particles of matter are discharged through the aperture 23 they will be met by the upward air draft passing through the cylinder. The heavier particles of matter, such for instance as the metal within the ore will not be as easily drawn as the lighter particles such as crushed rock. By the adjustment of the valve 6 in the suction pipe 5 the proper suction can be created within the cylinder 9 to influence the lighter particles only allowing the heavier ones to roll downwardly in the cylinder and be discharged at its lower end. The powdered rock or lighter particles will be sucked upwardly through the cylinder into the chamber 4, whence by reason of the baffle B shown by dotted lines in this figure they will be deflected downwardly and fall upon the inclined bottom of the said chamber. The door 28 will permit these particles of rock to be discharged from the air chamber.

Figure 4:
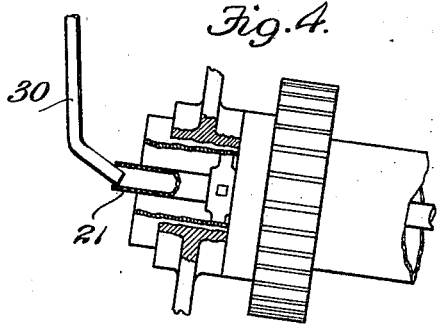
Fig. 4 is a detail view partly in section showing a slightly modified form of feed pipe.
Figure 3:
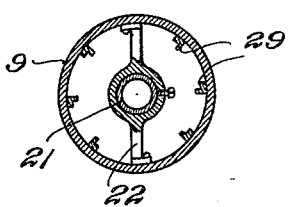
Fig. 3 is a cross sectional view through the cylinder taken on the line 3—3, of Fig. 1.

It will be seen from the foregoing that the particles of material discharged through the apertures 23 will be constantly agitated by the rotation of the cylinder and in this connection attention is called to Fig. 3 in which the plurality of small vanes 29 are shown secured longitudinally of the cylinder upon its interior. As the cylinder revolves these vanes will gather particles of matter and carry them upwardly until they fall by gravitiy back through the interior of the cylinder. The lighter material is constantly being thrown into the air current, giving the air a chance to force it steadily upward, while the heavier particles, not influenced by the air suction will be worked downwardly. In Fig. 4 I have shown a slight modification of the above described device in which I run the feed pipe shown at 30 bent to enter the tubular shaft at an angle.

In Fig. 5 I have shown another modification in which the tubular shaft is done away with entirely and the feed pipe 31 extends to a point within the revolving cylinder and discharges the matter to be separated. In this type of separator it is obvious that the lower portion of the feed pipe must be bent at an angle of sufficient inclination to insure the particles of matter being discharged into the cylinder. In this form the air suction would have to be differently adjusted to properly separate the heavier particles from the lighter, since the feed pipe can only extend into the revolving cylinder for a short distance.

In Figs. 6, 7 and 8 I have shown a still further modified form in which the tubular shaft shown at 32 will be rotatably mounted within the brackets 34 instead of secured therein as is the case in the type shown in Fig. 1. In this form the hollow shaft 32 will be held against rotation with the cylinder 35, by a stationary bracket 36 secured to the bearing at the upper end of the said cylinder. Since this form is especially adapted for use with very fine particles of matter I have designed a plurality of agitators shown at 37, which are in the form of stiff bristled brushes extending longitudinally of the cylinder and which are mounted upon arms extending from collars 38, the said collars being secured to the tubular shaft by means of set screws. It will be seen that as the particles of matter are discharged through the apertures in the tubular shaft 32, they will be picked up by the vanes in the revolving cylinder and since the agitators 37 are stationary while the cylinder revolves about them the particles of matter will be brushed from the vanes in passing and thus thrown out into the air suction.

In Fig. 9 I have shown a still further modified form in which I employ a beveled pinion 40 mounted upon the drive shaft 10 and meshing with a similar beveled pinion 41, which is mounted upon a stub shaft 42 carried by a bearing supported thereby the top of the air suction compartment. The opposite end of the said stub shaft also carries a pinion 43 which meshes with a similar pinion 44 secured to the tubular shaft 45. It will be seen by this arrangement that the tubular shaft within the cylinder can be made to rotate at a greater or less speed than the rotation of the cylinder itself or if desired the pinion 40 can be arranged to drive the pinion 41 in the opposite direction thus rotating the shaft 45 in the opposite direction to the direction of rotation of the cylinder. In this form a great amount of agitation can be produced thus insuring that the particles of matter will be thoroughly separated.

Having fully described my invention what I claim as new and desire to secure by Letters Patent, is:

1. A separator of the character described, comprising an inclined, rotating cylinder, means for creating an air suction through said cylinder, a concentric hollow shaft extending longitudinally within said cylinder and provided with apertures at a point intermediate the ends of the cylinder, a feed pipe extending into said hollow shaft and arranged to discharge matter to be separated into said shaft and means for rotating said hollow shaft in a direction opposite to the rotation of the cylinder.

2. A separator of the character described, comprising an inclined, rotating cylinder, means for creating an air suction through said cylinder, a concentric hollow shaft extending longitudinally within said cylinder and provided with apertures at a point intermediate the ends of the cylinder, a feed pipe extending into said hollow shaft and arranged to discharge matter to be separated into said shaft and means for rotating said hollow shaft in the direction of the cylinder or in the opposite direction.

3. A separator of the character described, comprising an inclined cylinder, means for creating an air suction through said cylinder, a concentric hollow shaft extending longitudinally within said cylinder and provided with apertures intermediate the ends of the cylinder, a hopper, a feed pipe extending from said hopper into the upper end of the hollow shaft, means for rotating the cylinder in one direction and means for rotating the hollow shaft in the opposite direction.

4. A separator of the character described, comprising an inclined rotating cylinder, means for creating an air suction through said cylinder, a concentric hollow shaft extending longitudinally through said cylinder and provided with apertures at a point intermediate the ends of the cylinder, a feed pipe extending into said hollow shaft at an angle thereto and arranged to discharge matter to be separated into said hollow shaft and means for rotating the cylinder and hollow shaft.

In testimony that I claim the above, I have hereunto subscribed my name.

ROBERT T. MEYER.